V. P. MAGARRELL.
PISTON RING.
APPLICATION FILED DEC. 3, 1914.
1,151,112.
Patented Aug. 24, 1915.
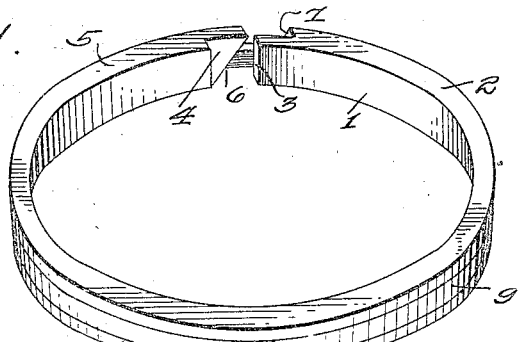
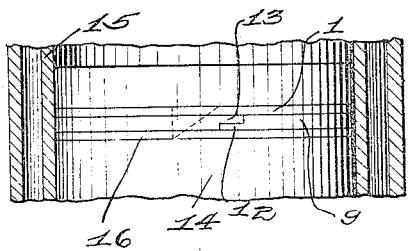
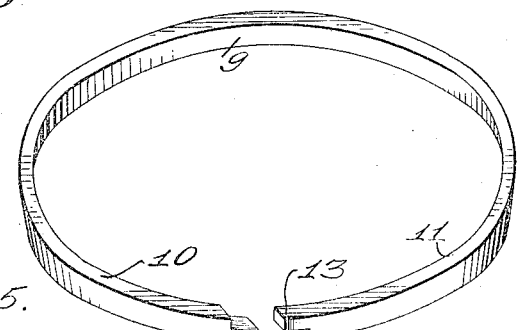
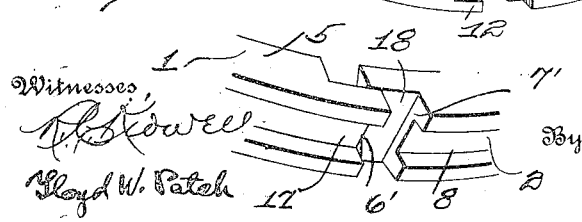
Inventor
Virgil P. Magarrell,
By Richard Owen,
Attorney

UNITED STATES PATENT OFFICE.

VIRGIL P. MAGARRELL, OF TILLAMOOK, OREGON.

PISTON-RING.

1,151,112.  Specification of Letters Patent.  Patented Aug. 24, 1915.

Application filed December 3, 1914. Serial No. 875,326.

*To all whom it may concern:*

Be it known that I, VIRGIL P. MAGARRELL, a citizen of the United States, residing at Tillamook, in the county of Tillamook and State of Oregon, have invented certain new and useful Improvements in Piston-Rings, of which the following is a specification.

An object of my invention is to provide a piston packing ring made up of two members one of which is adapted to be received in the usual ring groove provided in the outer face of a piston and has a peripheral groove in which the second member is mounted prior to fitting the piston to the cylinder, each of the members being in the form of a split ring to permit assembly thereof and to also accomplish the desired resiliency to form the packing.

A further object is to so construct the members that the split ends thereof are scarfed and overlapped in a manner to provide a substantially continuous ring throughout the entire peripheral extent of the piston groove.

With other objects in view, which will be referred to, my invention consists in the peculiar combination and novel arrangement of parts, such as will be hereinafter more fully described in connection with the accompanying drawings and more particularly pointed out in the appended claims.

In the drawings:—Figure 1 is a view in perspective of the complete ring with the two members thereof mounted in the operative relation with respect to each other. Fig. 2 is a view similar to Fig. 1 illustrating the inner ring member adapted to be fitted to the piston groove. Fig. 3 is a perspective view of the outer ring member. Fig. 4 is a fragmentary sectional view through the cylinder of an engine with a piston having my invention applied thereto mounted within the cylinder. Fig. 5 is a fragmentary detail perspective of a slightly modified form of the main ring member.

The main piston ring member 1 is in the form of a split ring made of sufficient extent that the ends thereof overlap when brought to a relation to form a complete ring of the size of the desired packing ring and these split ends are cut and notched or scarfed as is better illustrated in Figs. 1 and 2, one end having a notch upon the outer face thereof and the remaining end notched on the inner face, and also it is preferable that the end 2 be sheared off square as at 5 to fit within the squared notch 4 on the inner face of the end 5 of this member. The extreme end of the portion 5 of the member 1 is sheared diagonally as at 6 and the end 2 has a correspondingly shaped notch 7 provided at the outer end face thereof. In addition to having the ends thereof notched, the ring member 1 has a peripheral groove 8 formed in the outer face thereof and it is preferable that the diagonally notched portion 7 be sunk into the end 2 of the ring to a greater depth than the depth of this groove 8 and thus the diagonal abutting lap of the two ends is formed in a position and relation to close the ring to the straight passage of fluid therethrough in a relation coaxially with the piston. The second piston ring member or the auxiliary ring 9 is made of a dimension to fit within the groove 8 of the ring member 1 and the ends 10 and 11 thereof have tongues 12 and 13 provided to extend therefrom, the tongue 12 being positioned to have its outer face in a plane parallel with the lower face of the auxiliary ring member 9 and the tongue 13 to be similarly located with respect to the upper face of the ring member. By forming the ends of the auxiliary ring member 9 as hereinbefore set forth, a structure is provided with which the two ends may be interfitted and will lie within the groove 8.

The mounting of the ring is as better illustrated in Fig. 4, and in this disclosure the piston 14 within the cylinder 15 is disclosed. This piston 14 has the usual packing ring groove 16 and in this groove the ring member 1 will first be mounted, then the auxiliary spring member 9 is sprung into place in the groove 8 of the member 1 with the split ends thereof preferably spaced apart from the split ends of the ring member 1. The piston can then be fitted into place in the cylinder and the engagement of the outer peripheral faces of the ring members with the interior wall of the cylinder 15 will cause these ring members to be closed in their split portion to the relation illustrated in Fig. 4 where the notched and tongue ends will have interfitting engagement and fluid-tight joints are formed to prevent leakage within the cylinder around the piston.

In the form illustrated in Fig. 5, the speared cut 6' of the end 5 of the ring member 1 is made less acute and this necessitates a reduction of the angle of the cut at 7', also such a formation provides a tongue at 17 to fit entirely over the tongue 18 provided on the end 2 of the ring member 1. While the form of main or inner ring member illustrated in Fig. 5 does not give perhaps the same diagonal lap as is accomplished in the preferred form, yet the greatest strength is obtained in the transverse extent and the mounting of the ring member 9 in the groove 8 acts to close the joints in the member 1.

From the foregoing it will be seen that I have provided a piston packing ring composed of two split ring members adapted to be fitted one within the other and to lie in the usual packing-ring groove of a piston, and further that the diagonal notching of the one end and the forming of the opposite end of the main piston ring will permit fitting of these rings as the structure is contracted to the operative relation within the cylinder causing a joint to form which is overlapping in all parts exposed to fluid pressure and which will effectually stop the passage or escape of fluid around the piston as mounted within the cylinder, also it will be noted that by providing a main and auxiliary piston ring member, the main ring member may be made of a sufficient transverse extent to secure the desired strength and the auxiliary ring member constructed to be comparatively light and flexible in its action to thus accomplish a more efficient bearing and packing against the inner wall of the cylinder.

While I have herein shown and described only specific forms of my invention, it will be understood that slight changes might be resorted to in actual practice in the forming and arranging of the several parts of the invention without departing from the spirit and scope of my device, and hence I do not wish to be limited thereto except for such limitations as the claims may import.

I claim:—

1. A piston ring comprising a main ring member split to permit expansion thereof, a projection formed from one of the split ends of said ring near the outer face to follow the contour thereof and cut diagonally across the extreme end, a notch of diagonal form provided on the remaining end of said ring to receive said projection, said main ring member provided with a peripheral groove extending through said projection, and an auxiliary ring member to be received and fitted in said peripheral groove.

2. A piston ring comprising a main ring member split to permit expansion and contraction of the same, a projection formed from one of the split ends of said ring to lie in line with one of the circumferential faces thereof and cut diagonally across the extreme end, the remaining end of said ring provided with a notch to receive said projection and to thus dispose the joints between said ends in a diagonal line when the ring is fitted to a piston, said main ring provided with a circumferential groove extending entirely therearound, and an auxiliary ring of a thin flexible material received within said groove and tongued and notched at its split end to permit expansion and contraction.

In testimony whereof I affix my signature in presence of two witnesses.

VIRGIL P. MAGARRELL.

Witnesses:
S. G. THAYER,
T. H. GOREE.